(12) United States Patent
Heine

(10) Patent No.: US 7,647,781 B2
(45) Date of Patent: Jan. 19, 2010

(54) LOSS REDUCTION DEVICE FOR THE PRODUCTION OF ICE CREAM

(76) Inventor: Philippe Heine, 16, avenue Joffre, F-91710 Vert le Petit (FR)

( * ) Notice: Subject to any disclaimer, the term of this patent is extended or adjusted under 35 U.S.C. 154(b) by 161 days.

(21) Appl. No.: 10/548,129

(22) PCT Filed: Dec. 8, 2003

(86) PCT No.: PCT/FR03/03620
§ 371 (c)(1),
(2), (4) Date: Jan. 25, 2007

(87) PCT Pub. No.: WO2004/082394
PCT Pub. Date: Sep. 30, 2004

(65) Prior Publication Data
US 2007/0163281 A1    Jul. 19, 2007

(30) Foreign Application Priority Data
Mar. 4, 2003    (FR) .................................. 03 02608

(51) Int. Cl.
*A23G 9/00* (2006.01)

(52) U.S. Cl. ................ 62/66; 62/342; 62/435

(58) Field of Classification Search ........... 62/342–343, 62/434, 435; 222/146.6
See application file for complete search history.

(56) References Cited

U.S. PATENT DOCUMENTS

| | | | | |
|---|---|---|---|---|
| 2,263,794 A | * | 11/1941 | Wyen ........................... | 62/213 |
| 3,839,881 A | | 10/1974 | Calim | |
| 4,332,145 A | * | 6/1982 | Yuhasz et al. ................. | 62/342 |
| 4,484,597 A | | 11/1984 | Bravo | |
| 5,361,941 A | | 11/1994 | Parekh et al. | |
| 5,916,248 A | * | 6/1999 | Bravo ........................... | 62/68 |
| 6,299,025 B1 | | 10/2001 | Watanabe et al. | |

* cited by examiner

*Primary Examiner*—William E Tapolcai
(74) *Attorney, Agent, or Firm*—Thomas, Kayden, Horstemeyer, & Risley

(57) ABSTRACT

A device for reducing losses relating to the start-up of an industrial production line for ice cream provided with a traditional freezer. The invention relates to a device enabling the tubing used to convey the ice cream from the freezer to the dosing machine. Said device comprises a protector disposed around said tubing and a refrigerating fluid which can circulate therewithin with the aid of a pump which is actuated by a control.

8 Claims, 1 Drawing Sheet

ICE CREAM FLOW

1- FREEZER
2- TUBING
3- SURROUND
4- PROPORTIONING MACHINE
5- CONTROLLER
6- PUMP

ICE CREAM FLOW

1-FREEZER
2-TUBING
3-SURROUND
4- PROPORTIONING MACHINE
5-CONTROLLER
6-PUMP

LOSS REDUCTION DEVICE FOR THE PRODUCTION OF ICE CREAM

FIELD OF THE INVENTION

This invention relates to a device for reducing losses during start up of an ice cream production line equipped with a traditional freezer.

BACKGROUND

This operation is performed as follows in the current state of the art: the line is composed of a freezer (machine designed to cool a mix made in advance after having added a variable quantity of air depending on the recipe at a temperature called the proportioning temperature), tubing between this freezer and the proportioning machine, and therefore a proportioning machine that itself usually precedes a setting tunnel and packaging machines.

The freezer is started so as to work (freeze) the first mix quantities made in advance and these mixes are then sent to the proportioning machine through the tubing.

The first quantities cannot be proportioned because they are too soft and too liquid and they form a loss; attempts are made to recycle this loss later on in other installations under conditions that are not always satisfactory and often partial.

The purpose of this invention is to provide a means of reducing these start up losses.

An analysis of the phenomena involved during this start up operation shows that the main cause of losses is the quantity of product that has to be used to cool the tubing located between the freezer and the proportioning machine until the metal from which this tubing is made is cold enough so that bond conditions between the product and the tubing wall are such that proportioning is possible.

As it exits from the freezer, the temperature of the product is between −8° C. to −9° C. and 0° C. depending on the planned use of the product. The temperature of the tubing at the beginning of the operations is ambient temperature (18° C. or more). Therefore the solid mix melts as it comes into contact with the metal and flows too quickly, losing its consistency and making proportioning impossible until the tubing becomes sufficiently cold so that a bond is formed between the solid product mix and the metal, after a certain quantity of product has passed. The product can then be proportioned, but large losses have occurred.

SUMMARY

The device according to this invention reduces the temperature of the tubing to the required temperature before the beginning of proportioning (without using the product), thus avoiding losses.

DETAILED DESCRIPTION

Figure 1:
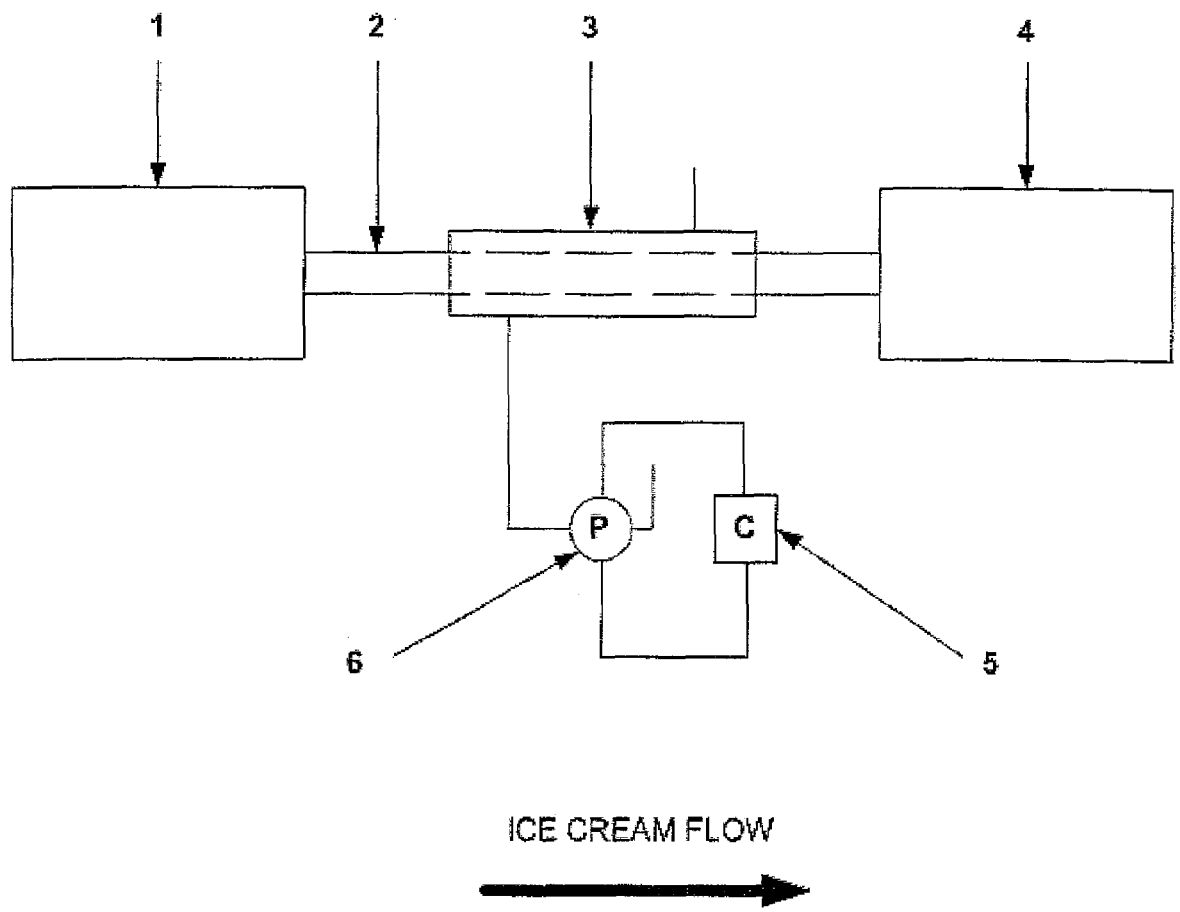
FIG. 1 is a schematic view of the present device.

As shown in FIG. 1, the device includes a freezer, which is connected via tubing 2 to a proportionary machine 4. The device reduces losses relating to the start-up of an industrial production line for ice cream, the line being provided with a traditional freezer 1.

According to a first characteristic, the device according to the invention has three elements:

the first element called "frigorie transport fluid" is a fluid at a temperature close to the required proportioning temperature, the second element called the "surround" 3 is a device that surrounds the tubing 2 and carries circulation of the "frigorie transport fluid" inside it, the third element is called the "pump" 6 and circulates fluid inside the "surround" 3.

According to another characteristic of the invention, the device will be equipped with a control element or controller 5, called the "control" that circulates the "frigorie transport fluid" inside the "surround" for a required time before proportioning is started.

According to one particular embodiment, the "frigorie transport fluid" can be glycol water that is often used in ice cream production factories at a temperature of −5 to −6° C., in central distribution.

According to another particular embodiment, the "surround" may be a coil made of a hollow pipe surrounding the tubing 2 with adjacent turns so as to provide a sort of second casing surrounding this tubing. The efficiency of the system should be much better if the hollow pipe section is parallelepiped shaped (rather than round) so that a surface (and not linear) contact with the tubing can be made. The material used to make the "surround" must be capable of transferring frigories from the "frigorie transport fluid" to the tubing.

According to another particular embodiment, the "pump" must be chosen from the conventional range of commercially available products and the "control" should be made using classical automation rules.

The main advantage provided by the device according to the invention is the reduction of losses related to start up of a classical industrial ice cream fabrication installation. This is accomplished by reducing the temperature of the tubing to the required temperature before the beginning of proportioning, without using the product to reduce the temperature.

The invention claimed is:

1. An installation comprising:
an industrial ice cream production line, the line including a freezer, a proportioning machine and tubing that carries the ice cream from the freezer to the proportioning machine,
and a device for reducing losses related to start up of said industrial ice cream production line, the device comprising:
a frigorie transport fluid at a temperature close to a future proportioning temperature of the ice cream;
a surround surrounding the tubing while enabling circulation of the frigorie transport fluid inside the surround; and
a pump, and a control means for actuating the pump for a required time before proportioning is started, designed to circulate the fluid inside the surround.

2. The device according to claim 1 wherein the surround is a coil made of hollow pipe surrounding the tubing with adjacent turns so as to provide a second casing surrounding this tubing.

3. The device according to claim 2 wherein the section of the hollow tube is parallelepiped shaped so that a surface contact with the tubing can be made.

4. The device of claim 1 wherein the material used to make the surround is capable of transferring frigories from the frigorie transport fluid to the tubing.

5. The device of claim 2, wherein the material used to make the surround is capable of transferring frigories from the frigorie transport fluid to the tubing.

6. The device of claim 3, wherein the material used to make the surround is capable of transferring frigories from the frigorie transport fluid to the tubing.

7. A method for reducing losses related to start up of an industrial ice cream production line, the line including a freezer, a proportioning machine and tubing that carries the ice cream from the freezer to the proportioning machine, and a device for reducing losses related to start up of said industrial ice cream production line, the device comprising:
- a frigorie transport fluid at a temperature close to a future proportioning temperature of the ice cream;
- a surround surrounding the tubing while enabling circulation of the frigorie transport fluid inside the surround; and
- a pump, with a control means designed to circulate the fluid inside the surround;

the method comprising:
- actuating the pump for a required time before proportioning is started; and
- reducing the temperature of the tubing before starting proportioning without using the ice cream.

8. The method according to claim 7, wherein the temperature of the tubing is reduced before starting proportioning until the tubing is sufficiently cold so that bond conditions between the ice cream and the tubing wall are such that proportioning is possible.

* * * * *

UNITED STATES PATENT AND TRADEMARK OFFICE
CERTIFICATE OF CORRECTION

PATENT NO. : 7,647,781 B2  Page 1 of 1
APPLICATION NO. : 10/548129
DATED : January 19, 2010
INVENTOR(S) : Philippe Heine It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 220 days.

Signed and Sealed this

Sixteenth Day of November, 2010

David J. Kappos
*Director of the United States Patent and Trademark Office*